US009645398B2

(12) United States Patent
Bickerstaff et al.

(10) Patent No.: US 9,645,398 B2
(45) Date of Patent: May 9, 2017

(54) ELECTRONIC CORRECTION BASED ON EYE TRACKING

(71) Applicant: Sony Computer Entertainment Europe Limited, London (GB)

(72) Inventors: Ian Henry Bickerstaff, London (GB); Sharwin Winesh Raghoebardajal, London (GB); Simon Mark Benson, London (GB)

(73) Assignee: Sony Computer Entertainment Europe Limited (GB)

( * ) Notice: Subject to any disclaimer, the term of this patent is extended or adjusted under 35 U.S.C. 154(b) by 0 days.

(21) Appl. No.: 14/929,540

(22) Filed: Nov. 2, 2015

(65) Prior Publication Data

US 2016/0070107 A1    Mar. 10, 2016

Related U.S. Application Data

(62) Division of application No. 14/300,697, filed on Jun. 10, 2014, now Pat. No. 9,207,455.

(30) Foreign Application Priority Data

Jun. 11, 2013  (GB) .................................. 1310368.4
Aug. 21, 2013  (GB) .................................. 1314975.2

(51) Int. Cl.
*G02B 27/14*     (2006.01)
*G09G 5/00*      (2006.01)
(Continued)

(52) U.S. Cl.
CPC ..... *G02B 27/0172* (2013.01); *G02B 27/0093* (2013.01); *G02B 27/01* (2013.01);
(Continued)

(58) Field of Classification Search
CPC .. G02B 27/01; G02B 27/017; G02B 27/0172; G06F 3/013
(Continued)

(56) References Cited

U.S. PATENT DOCUMENTS

2008/0002262 A1   1/2008  Chirieleison
2010/0157433 A1   6/2010  Mukawa et al.
(Continued)

FOREIGN PATENT DOCUMENTS

EP        1731943 A1   12/2006
JP        2009269551   11/2009
(Continued)

OTHER PUBLICATIONS

Search Report for Application No. GB 1310368.4 dated Nov. 27, 2013.
(Continued)

*Primary Examiner* — William Choi
(74) *Attorney, Agent, or Firm* — Lerner, David, Littenberg, Krumholz & Mentlik, LLP

(57) ABSTRACT

A head mountable display (HMD) system comprises an eye position detector comprising one or more cameras configured to detect the position of each of the HMD user's eyes; a dominant eye detector configured to detect a dominant eye of the HMD user; and an image generator configured to generate images for display by the HMD in dependence upon the HMD user's eye positions, the image generator being configured to apply a greater weight to the detected position of the dominant eye than to the detected position of the non-dominant eye.

11 Claims, 11 Drawing Sheets

(51) Int. Cl.
    *G02B 27/01*          (2006.01)
    *G02B 27/00*          (2006.01)
    *G06F 3/01*           (2006.01)

(52) U.S. Cl.
    CPC ........... *G02B 27/017* (2013.01); *G06F 3/013* (2013.01); *G02B 2027/0138* (2013.01); *G02B 2027/0187* (2013.01)

(58) Field of Classification Search
    USPC .......................................... 359/630; 345/7–9
    See application file for complete search history.

(56) References Cited

U.S. PATENT DOCUMENTS

| | | |
|---|---|---|
| 2013/0021226 A1 | 1/2013 | Bell |
| 2013/0106674 A1* | 5/2013 | Wheeler .............. G02B 27/017 345/8 |
| 2014/0282144 A1 | 9/2014 | Maciocci |

FOREIGN PATENT DOCUMENTS

| | | |
|---|---|---|
| WO | 9513564 A1 | 5/1995 |
| WO | 9735223 A1 | 9/1997 |
| WO | 02086590 A1 | 10/2002 |

OTHER PUBLICATIONS

Search Report for Application No. GB 1314975.2 dated Nov. 27, 2013.
Search Report for Application No. GB 1410397.2 dated Dec. 9, 2014.

\* cited by examiner

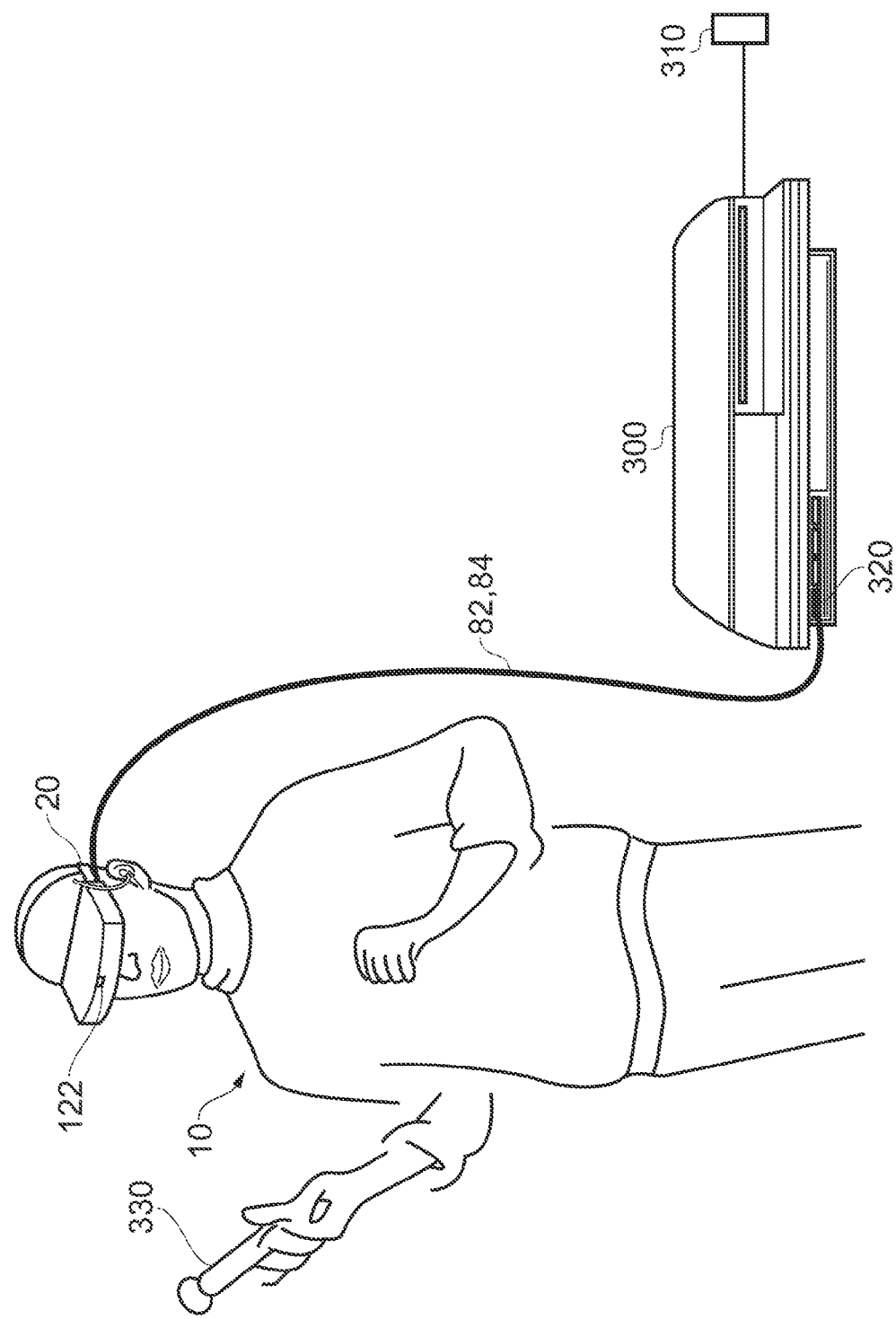

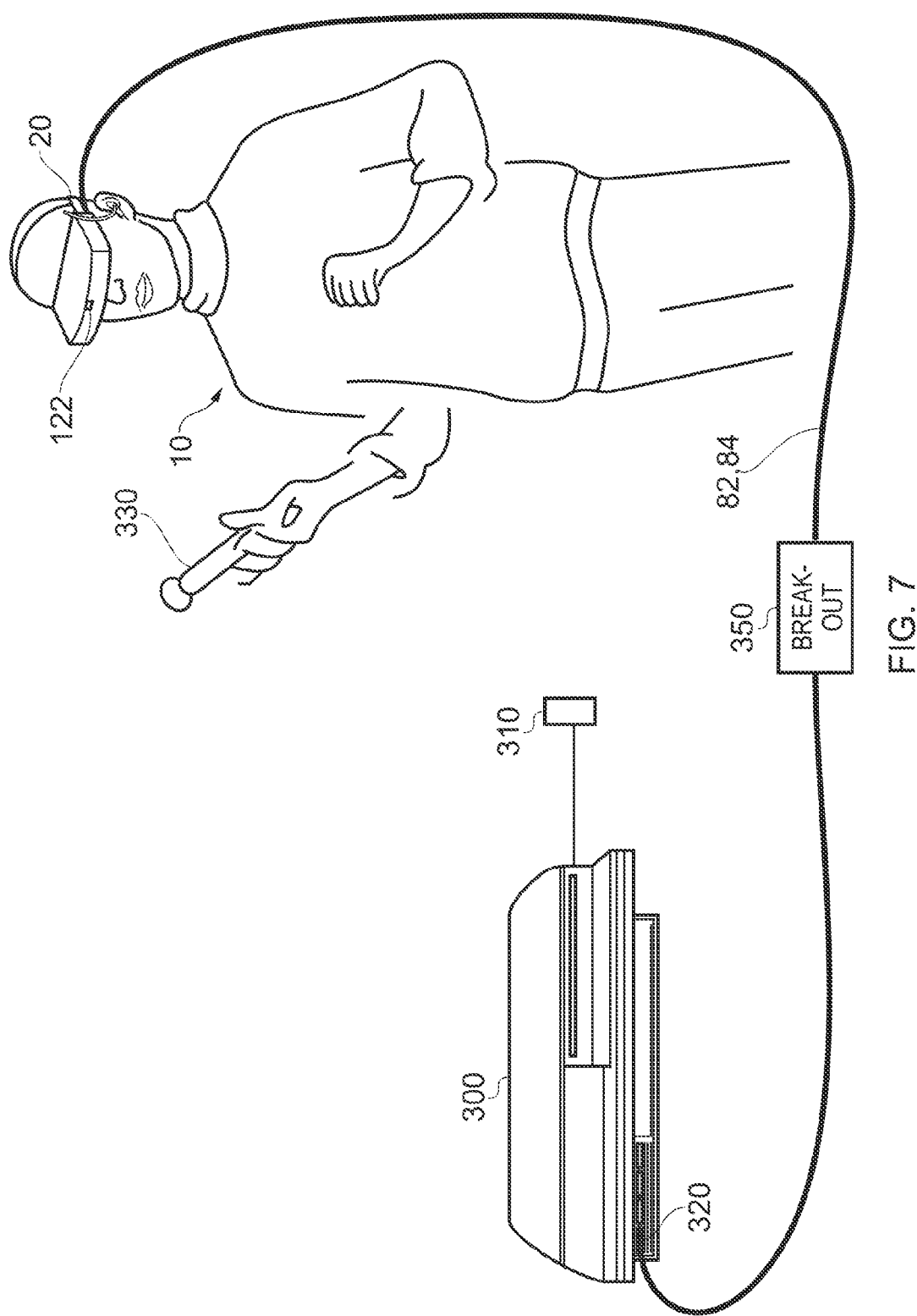

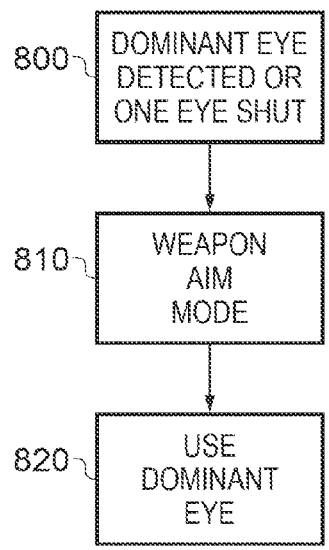
FIG. 19
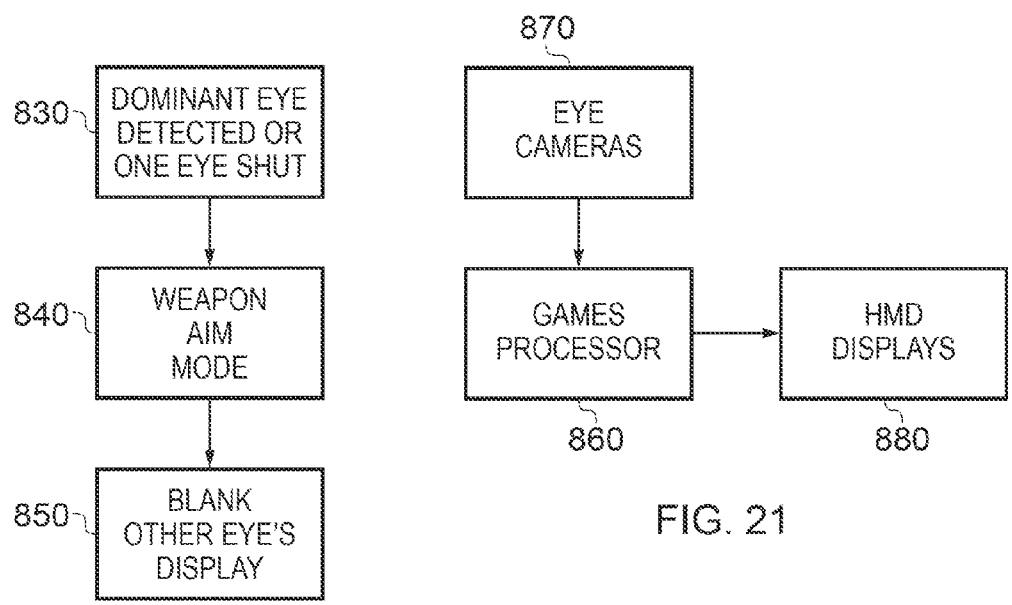
FIG. 20
FIG. 21

ELECTRONIC CORRECTION BASED ON EYE TRACKING

CROSS REFERENCE TO RELATED APPLICATIONS

The present application is a divisional of U.S. patent application Ser. No. 14/300,697, filed Jun. 10, 2014, which claims the benefit of and priority to UK Patent Application No. GB 1310368.4, filed Jun. 11, 2013, and UK Patent Application No. GB 1314975.2, filed Aug. 21, 2013, the entire contents of which are incorporated herein by reference.

BACKGROUND

Field of the Disclosure

This invention relates to head-mountable apparatus and systems.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

A head-mountable display (HMD) is one example of a head-mountable apparatus. Audio headphones comprising a frame supporting one or more audio transducers are another example of a head-mountable apparatus. A head-mounted torch or light is a further example of a head-mountable apparatus. The following background discussions will relate mainly to HMDs, but the principles are also applicable to other types of head-mountable apparatus.

In an HMD, an image or video display device is provided which may be worn on the head or as part of a helmet. Either one eye or both eyes are provided with small electronic display devices.

Some HMDs allow a displayed image to be superimposed on a real-world view. This type of HMD can be referred to as an optical see-through HMD and generally requires the display devices to be positioned somewhere other than directly in front of the user's eyes. Some way of deflecting the displayed image so that the user may see it is then required. This might be through the use of a partially reflective mirror placed in front of the user's eyes so as to allow the user to see through the mirror but also to see a reflection of the output of the display devices. In another arrangement, disclosed in EP-A-1 731 943 and US-A-2010/0157433, a waveguide arrangement employing total internal reflection is used to convey a displayed image from a display device disposed to the side of the user's head so that the user may see the displayed image but still see a view of the real world through the waveguide. Once again, in either of these types of arrangement, a virtual image of the display is created (using known techniques) so that the user sees the virtual image at an appropriate size and distance to allow relaxed viewing. For example, even though the physical display device may be tiny (for example, 10 mm×10 mm) and may be just a few millimetres from the user's eye, the virtual image may be arranged so as to be perceived by the user at a distance of (for example) 20 m from the user, having a perceived size of 5 m×5 m.

Other HMDs, however, allow the user only to see the displayed images, which is to say that they obscure the real world environment surrounding the user. This type of HMD can position the actual display devices in front of the user's eyes, in association with appropriate lenses or other optical components which place a virtual displayed image at a suitable distance for the user to focus in a relaxed manner—for example, at a similar virtual distance and perceived size as the optical see-through HMD described above. This type of device might be used for viewing movies or similar recorded content, or for viewing so-called virtual reality content representing a virtual space surrounding the user. It is of course however possible to display a real-world view on this type of HMD, for example by using a forward-facing camera to generate images for display on the display devices.

Although the original development of HMDs was perhaps driven by the military and professional applications of these devices, HMDs are becoming more popular for use by casual users in, for example, computer game or domestic computing applications.

The foregoing paragraphs have been provided by way of general introduction, and are not intended to limit the scope of the following claims. The described embodiments, together with further advantages, will be best understood by reference to the following detailed description taken in conjunction with the accompanying drawings.

Various aspects and features of the present invention are defined in the appended claims and within the text of the accompanying description and include at least a head mountable apparatus such as a display and a method of operating a head-mountable apparatus as well as a computer program.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 6 and 7 schematically illustrate a user wearing an HMD connected to a Sony® PlayStation 3® games console;

FIGS. 19 and 20 are schematic flowcharts illustrating aspects of operation of a games machine; and FIG. 21 schematically illustrates a games machine.

DESCRIPTION OF THE EMBODIMENTS

Figure 1:
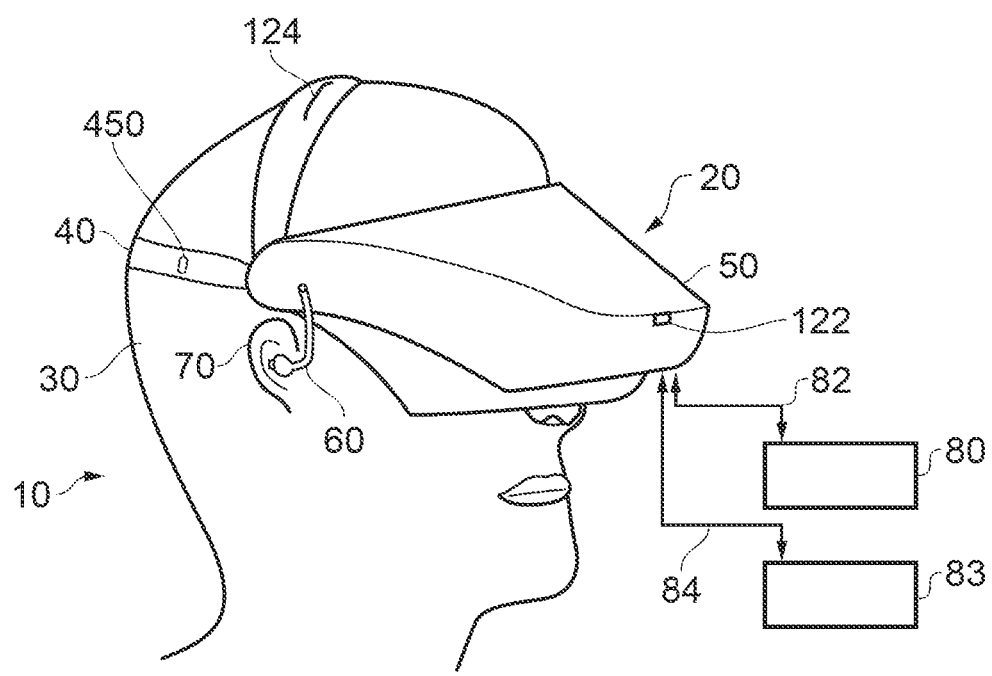
FIG. 1 schematically illustrates an HMD worn by a user.

Referring now to FIG. 1, a user 10 is wearing an HMD 20 (as an example of a generic head-mountable apparatus—other examples, where the technical context allows, including audio headphones or a head-mountable light source) on the user's head 30. The HMD comprises a frame 40, in this example formed of a rear strap and a top strap, and a display portion 50.

Note that the HMD of FIG. 1 may comprise further features, to be described below in connection with other drawings, but which are not shown in FIG. 1 for clarity of this initial explanation.

The HMD of FIG. 1 completely (or at least substantially completely) obscures the user's view of the surrounding environment. All that the user can see is the pair of images displayed within the HMD.

The HMD has associated headphone audio transducers or earpieces 60 which fit into the user's left and right ears 70. The earpieces 60 replay an audio signal provided from an external source, which may be the same as the video signal source which provides the video signal for display to the user's eyes.

The combination of the fact that the user can see only what is displayed by the HMD and, subject to the limitations of the noise blocking or active cancellation properties of the earpieces and associated electronics, can hear only what is provided via the earpieces, mean that this HMD may be considered as a so-called "full immersion" HMD. Note however that in some embodiments the HMD is not a full immersion HMD, and may provide at least some facility for the user to see and/or hear the user's surroundings. This could be by providing some degree of transparency or partial transparency in the display arrangements, and/or by projecting a view of the outside (captured using a camera, for example a camera mounted on the HMD) via the HMD's displays, and/or by allowing the transmission of ambient sound past the earpieces and/or by providing a microphone to generate an input sound signal (for transmission to the earpieces) dependent upon the ambient sound.

A front-facing camera 122 may capture images to the front of the HMD, in use. A Bluetooth® antenna 124 may provide communication facilities or may simply be arranged as a directional antenna to allow a detection of the direction of a nearby Bluetooth transmitter.

In operation, a video signal is provided for display by the HMD. This could be provided by an external video signal source 80 such as a video games machine or data processing apparatus (such as a personal computer), in which case the signals could be transmitted to the HMD by a wired or a wireless connection 82. Examples of suitable wireless connections include Bluetooth® connections. Audio signals for the earpieces 60 can be carried by the same connection. Similarly, any control signals passed from the HMD to the video (audio) signal source may be carried by the same connection. Furthermore, a power supply 83 (including one or more batteries and/or being connectable to a mains power outlet) may be linked by a cable 84 to the HMD. Note that the power supply 83 and the video signal source 80 may be separate units or may be embodied as the same physical unit. There may be separate cables for power and video (and indeed for audio) signal supply, or these may be combined for carriage on a single cable (for example, using separate conductors, as in a USB cable, or in a similar way to a "power over Ethernet" arrangement in which data is carried as a balanced signal and power as direct current, over the same collection of physical wires). The video and/or audio signal may be carried by, for example, an optical fibre cable. In other embodiments, at least part of the functionality associated with generating image and/or audio signals for presentation to the user may be carried out by circuitry and/or processing forming part of the HMD itself. A power supply may be provided as part of the HMD itself.

Some embodiments of the invention are applicable to an HMD having at least one electrical and/or optical cable linking the HMD to another device, such as a power supply and/or a video (and/or audio) signal source. So, embodiments of the invention can include, for example:

(a) an HMD having its own power supply (as part of the HMD arrangement) but a cabled connection to a video and/or audio signal source;

(b) an HMD having a cabled connection to a power supply and to a video and/or audio signal source, embodied as a single physical cable or more than one physical cable;

(c) an HMD having its own video and/or audio signal source (as part of the HMD arrangement) and a cabled connection to a power supply; or (d) an HMD having a wireless connection to a video and/or audio signal source and a cabled connection to a power supply.

If one or more cables are used, the physical position at which the cable 82 and/or 84 enters or joins the HMD is not particularly important from a technical point of view. Aesthetically, and to avoid the cable(s) brushing the user's face in operation, it would normally be the case that the cable(s) would enter or join the HMD at the side or back of the HMD (relative to the orientation of the user's head when worn in normal operation). Accordingly, the position of the cables 82, 84 relative to the HMD in FIG. 1 should be treated merely as a schematic representation.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other (not full immersion) examples, the user's view of the external environment may not in fact be entirely obscured; the displayed images could be arranged so as to be superposed (from the user's point of view) over the external environment. An example of such an arrangement will be described below with reference to FIG. 4.

In the example of FIG. 1, a separate respective display is provided for each of the user's eyes. A schematic plan view of how this is achieved is provided as FIG. 2, which illustrates the positions 100 of the user's eyes and the relative position 110 of the user's nose. The display portion 50, in schematic form, comprises an exterior shield 120 to mask ambient light from the user's eyes and an internal shield 130 which prevents one eye from seeing the display intended for the other eye. The combination of the user's face, the exterior shield 120 and the interior shield 130 form two compartments 140, one for each eye. In each of the compartments there is provided a display element 150 and one or more optical elements 160. The way in which the display element and the optical element(s) cooperate to provide a display to the user will be described with reference to FIG. 3.

Figure 3:
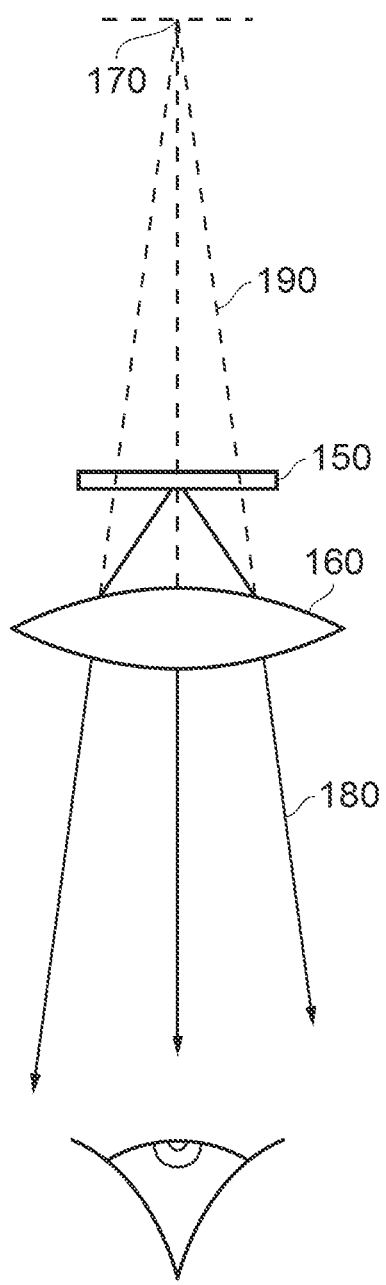
FIG. 3 schematically illustrates the formation of a virtual image by an HMD.

Referring to FIG. 3, the display element 150 generates a displayed image which is (in this example) refracted by the optical elements 160 (shown schematically as a convex lens but which could include compound lenses or other elements) so as to generate a virtual image 170 which appears to the user to be larger than and significantly further away than the real image generated by the display element 150. As an example, the virtual image may have an apparent image size (image diagonal) of more than 1 m and may be disposed at a distance of more than 1 m from the user's eye (or from the frame of the HMD). In general terms, depending on the purpose of the HMD, it is desirable to have the virtual image disposed a significant distance from the user. For example, if the HMD is for viewing movies or the like, it is desirable that the user's eyes are relaxed during such viewing, which requires a distance (to the virtual image) of at least several metres. In FIG. 3, solid lines (such as the line 180) are used to denote real optical rays, whereas broken lines (such as the line 190) are used to denote virtual rays.

Figure 4:
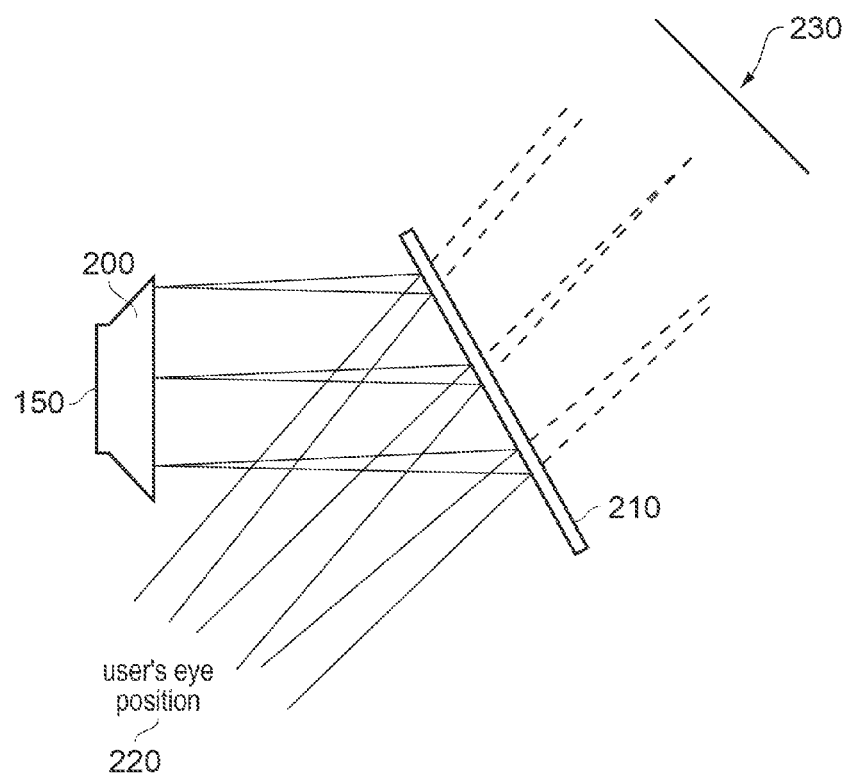
FIG. 4 schematically illustrates another type of display for use in an HMD.

An alternative arrangement is shown in FIG. 4. This arrangement may be used where it is desired that the user's view of the external environment is not entirely obscured. However, it is also applicable to HMDs in which the user's external view is wholly obscured. In the arrangement of FIG. 4, the display element 150 and optical elements 200 cooperate to provide an image which is projected onto a mirror 210, which deflects the image towards the user's eye position 220. The user perceives a virtual image to be located at a position 230 which is in front of the user and at a suitable distance from the user.

In the case of an HMD in which the user's view of the external surroundings is entirely obscured, the mirror 210 can be a substantially 100% reflective mirror. The arrangement of FIG. 4 then has the advantage that the display element and optical elements can be located closer to the centre of gravity of the user's head and to the side of the user's eyes, which can produce a less bulky HMD for the user to wear. Alternatively, if the HMD is designed not to completely obscure the user's view of the external environment, the mirror 210 can be made partially reflective so that the user sees the external environment, through the mirror 210, with the virtual image superposed over the real external environment.

Figure 5:
FIG. 5 schematically illustrates a pair of stereoscopic images.

In the case where separate respective displays are provided for each of the user's eyes, it is possible to display stereoscopic images. An example of a pair of stereoscopic images for display to the left and right eyes is shown in FIG. 5. The images exhibit a lateral displacement relative to one another, with the displacement of image features depending upon the (real or simulated) lateral separation of the cameras by which the images were captured, the angular convergence of the cameras and the (real or simulated) distance of each image feature from the camera position.

Note that the lateral displacements in FIG. 5 could in fact be the other way round, which is to say that the left eye image as drawn could in fact be the right eye image, and the right eye image as drawn could in fact be the left eye image. This is because some stereoscopic displays tend to shift objects to the right in the right eye image and to the left in the left eye image, so as to simulate the idea that the user is looking through a stereoscopic window onto the scene beyond. However, some HMDs use the arrangement shown in FIG. 5 because this gives the impression to the user that the user is viewing the scene through a pair of binoculars. The choice between these two arrangements is at the discretion of the system designer.

In some situations, an HMD may be used simply to view movies and the like. In this case, there is no change required to the apparent viewpoint of the displayed images as the user turns the user's head, for example from side to side. In other uses, however, such as those associated with virtual reality (VR) or augmented reality (AR) systems, the user's viewpoint needs to track movements with respect to a real or virtual space in which the user is located.

FIG. 6 schematically illustrates a user wearing an HMD connected to a Sony® PlayStation 3® games console 300 as an example of a base device. The games console 300 is connected to a mains power supply 310 and (optionally) to a main display screen (not shown). A cable, acting as the cables 82, 84 discussed above (and so acting as both power supply and signal cables), links the HMD 20 to the games console 300 and is, for example, plugged into a USB socket 320 on the console 300. Note that in the present embodiments, a single physical cable is provided which fulfils the functions of the cables 82, 84. In FIG. 6, the user is also shown holding a hand-held controller 330 which may be, for example, a Sony® Move® controller which communicates wirelessly with the games console 300 to control (or to contribute to the control of) game operations relating to a currently executed game program.

The video displays in the HMD 20 are arranged to display images generated by the games console 300, and the earpieces 60 in the HMD 20 are arranged to reproduce audio signals generated by the games console 300. Note that if a USB type cable is used, these signals will be in digital form when they reach the HMD 20, such that the HMD 20 comprises a digital to analogue converter (DAC) to convert at least the audio signals back into an analogue form for reproduction.

Images from the camera 122 mounted on the HMD 20 are passed back to the games console 300 via the cable 82, 84. Similarly, if motion or other sensors are provided at the HMD 20, signals from those sensors may be at least partially processed at the HMD 20 and/or may be at least partially processed at the games console 300. The use and processing of such signals will be described further below.

The USB connection from the games console 300 also provides power to the HMD 20, according to the USB standard.

FIG. 7 schematically illustrates a similar arrangement in which the games console is connected (by a wired or wireless link) to a so-called "break out box" acting as a base or intermediate device 350, to which the HMD 20 is connected by a cabled link 82,84. The breakout box has various functions in this regard. One function is to provide a location, near to the user, for some user controls relating to the operation of the HMD, such as (for example) one or more of a power control, a brightness control, an input source selector, a volume control and the like. Another function is to provide a local power supply for the HMD (if one is needed according to the embodiment being discussed). Another function is to provide a local cable anchoring point. In this last function, it is not envisaged that the break-out box 350 is fixed to the ground or to a piece of furniture, but rather than having a very long trailing cable from the games console 300, the break-out box provides a locally weighted point so that the cable 82, 84 linking the HMD 20 to the break-out box will tend to move around the position of the break-out box. This can improve user safety and comfort by avoiding the use of very long trailing cables.

It will be appreciated that the localisation of processing in the various techniques described in this application can be varied without changing the overall effect, given that an HMD may form part of a set or cohort of interconnected devices (that is to say, interconnected for the purposes of data or signal transfer, but not necessarily connected by a physical cable). So, processing which is described as taking place "at" one device, such as at the HMD, could be devolved to another device such as the games console (base device) or the break-out box. Processing tasks can be shared amongst devices. Source signals, on which the processing is to take place, could be distributed to another device, or the processing results from the processing of those source signals could be sent to another device, as required. So any references to processing taking place at a particular device should be understood in this context. Similarly, where an interaction between two devices is basically symmetrical, for example where a camera or sensor on one device detects a signal or feature of the other device, it will be understood that unless the context prohibits this, the two devices could be interchanged without any loss of functionality.

As mentioned above, in some uses of the HMD, such as those associated with virtual reality (VR) or augmented reality (AR) systems, the user's viewpoint needs to track movements with respect to a real or virtual space in which the user is located.

This tracking is carried out by detecting motion of the HMD and varying the apparent viewpoint of the displayed images so that the apparent viewpoint tracks the motion.

Figure 8:
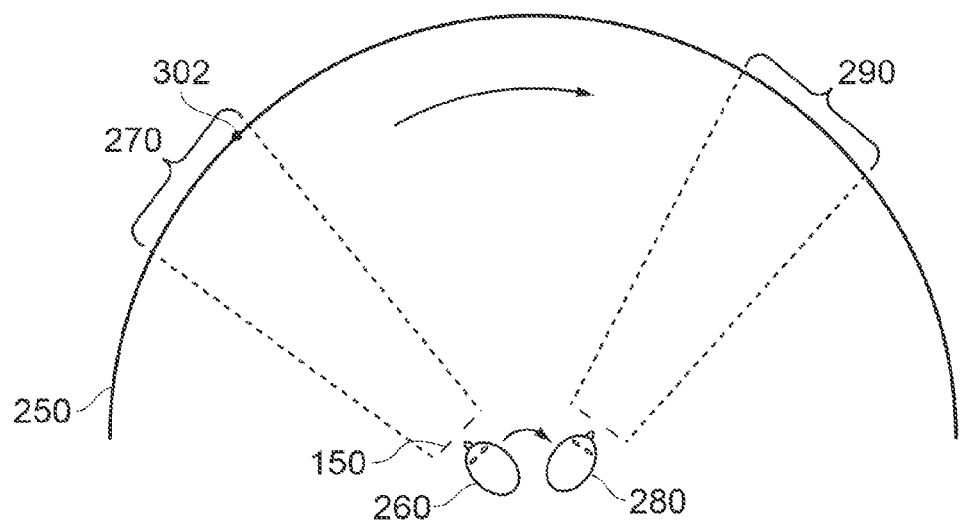
FIG. 8 schematically illustrates a change of view of user of an HMD.

FIG. 8 schematically illustrates the effect of a user head movement in a VR or AR system.

Referring to FIG. 8, a virtual environment is represented by a (virtual) spherical shell 250 around a user. Because of the need to represent this arrangement on a two-dimensional paper drawing, the shell is represented by a part of a circle, at a distance from the user equivalent to the separation of the displayed virtual image from the user. A user is initially at a first position 260 and is directed towards a portion 270 of the virtual environment. It is this portion 270 which is represented in the images displayed on the display elements 150 of the user's HMD.

Consider the situation in which the user then moves his head to a new position and/or orientation 280. In order to maintain the correct sense of the virtual reality or augmented reality display, the displayed portion of the virtual environment also moves so that, at the end of the movement, a new portion 290 is displayed by the HMD.

So, in this arrangement, the apparent viewpoint within the virtual environment moves with the head movement. If the head rotates to the right side, for example, as shown in FIG. 8, the apparent viewpoint also moves to the right from the user's point of view. If the situation is considered from the aspect of a displayed object, such as a displayed object 300, this will effectively move in the opposite direction to the head movement. So, if the head movement is to the right, the apparent viewpoint moves to the right but an object such as the displayed object 300 which is stationary in the virtual environment will move towards the left of the displayed image and eventually will disappear off the left-hand side of the displayed image, for the simple reason that the displayed portion of the virtual environment has moved to the right whereas the displayed object 300 has not moved in the virtual environment.

Figure 2:
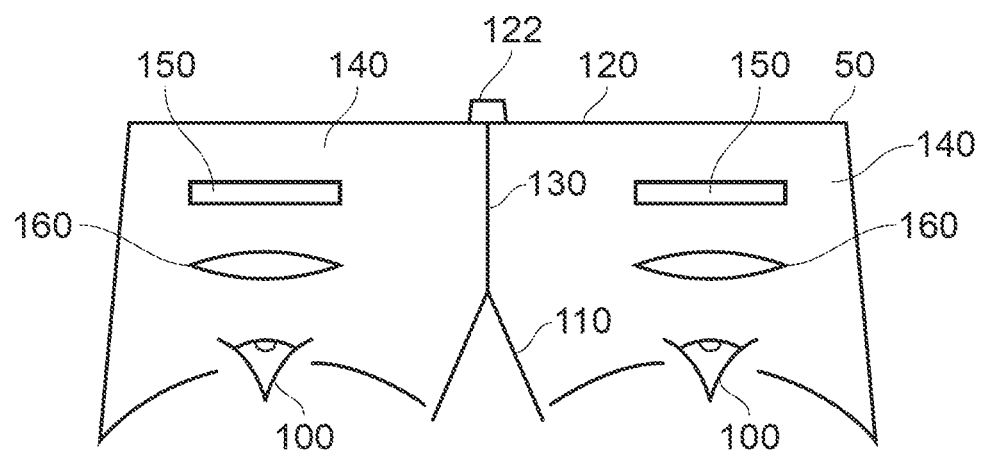
FIG. 2 is a schematic plan view of an HMD.
Figure 9A:
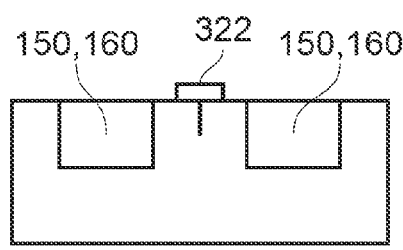
FIGS. 9a and 9b schematically illustrate HMDs with motion sensing.
Figure 9B:
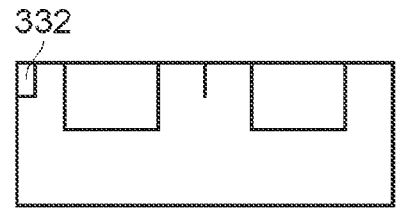

FIGS. 9a and 9b schematically illustrated HMDs with motion sensing. The two drawings are in a similar format to that shown in FIG. 2. That is to say, the drawings are schematic plan views of an HMD, in which the display element 150 and optical elements 160 are represented by a simple box shape. Many features of FIG. 2 are not shown, for clarity of the diagrams. Both drawings show examples of HMDs with a motion detector for detecting motion of the observer's head.

In FIG. 9a, a forward-facing camera 322 is provided on the front of the HMD. This may be the same camera as the camera 122 discussed above, or may be an additional camera. This does not necessarily provide images for display to the user (although it could do so in an augmented reality arrangement). Instead, its primary purpose in the present embodiments is to allow motion sensing. A technique for using images captured by the camera 322 for motion sensing will be described below in connection with FIG. 10. In these arrangements, the motion detector comprises a camera mounted so as to move with the frame; and an image comparator operable to compare successive images captured by the camera so as to detect inter-image motion.

FIG. 9b makes use of a hardware motion detector 332. This can be mounted anywhere within or on the HMD. Examples of suitable hardware motion detectors are piezoelectric accelerometers or optical fibre gyroscopes. It will of course be appreciated that both hardware motion detection and camera-based motion detection can be used in the same device, in which case one sensing arrangement could be used as a backup when the other one is unavailable, or one sensing arrangement (such as the camera) could provide data for changing the apparent viewpoint of the displayed images, whereas the other (such as an accelerometer) could provide data for image stabilisation.

Figure 10:
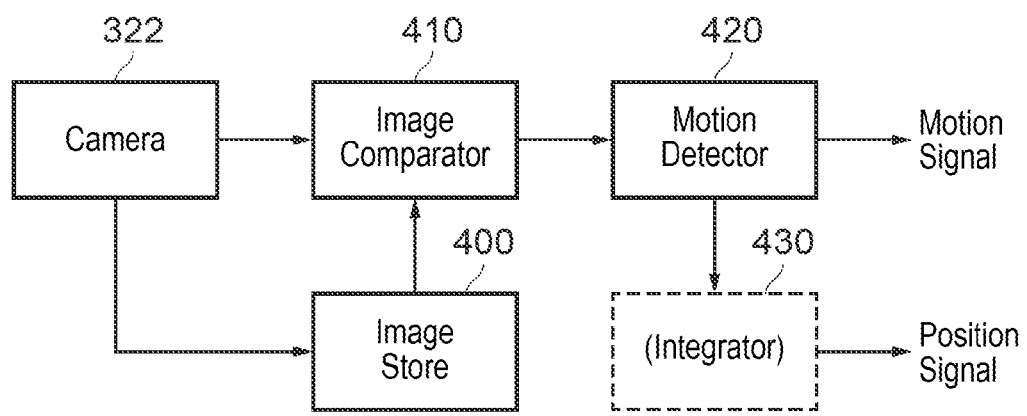
FIG. 10 schematically illustrates a position sensor based on optical flow detection.

FIG. 10 schematically illustrates one example of motion detection using the camera 322 of FIG. 9a.

The camera 322 is a video camera, capturing images at an image capture rate of, for example, 25 images per second. As each image is captured, it is passed to an image store 400 for storage and is also compared, by an image comparator 410, with a preceding image retrieved from the image store. The comparison uses known block matching techniques (so-called "optical flow" detection) to establish whether substantially the whole image has moved since the time at which the preceding image was captured. Localised motion might indicate moving objects within the field of view of the camera 322, but global motion of substantially the whole image would tend to indicate motion of the camera rather than of individual features in the captured scene, and in the present case because the camera is mounted on the HMD, motion of the camera corresponds to motion of the HMD and in turn to motion of the user's head.

The displacement between one image and the next, as detected by the image comparator 410, is converted to a signal indicative of motion by a motion detector 420. If required, the motion signal is converted by to a position signal by an integrator 430.

As mentioned above, as an alternative to, or in addition to, the detection of motion by detecting inter-image motion between images captured by a video camera associated with the HMD, the HMD can detect head motion using a mechanical or solid state detector 332 such as an accelerometer. This can in fact give a faster response in respect of the indication of motion, given that the response time of the video-based system is at best the reciprocal of the image capture rate. In some instances, therefore, the detector 332 can be better suited for use with higher frequency motion detection. However, in other instances, for example if a high image rate camera is used (such as a 200 Hz capture rate camera), a camera-based system may be more appropriate. In terms of FIG. 10, the detector 332 could take the place of the camera 322, the image store 400 and the comparator 410, so as to provide an input directly to the motion detector 420. Or the detector 332 could take the place of the motion detector 420 as well, directly providing an output signal indicative of physical motion.

Other position or motion detecting techniques are of course possible. For example, a mechanical arrangement by which the HMD is linked by a moveable pantograph arm to a fixed point (for example, on a data processing device or on a piece of furniture) may be used, with position and orientation sensors detecting changes in the deflection of the pantograph arm. In other embodiments, a system of one or more transmitters and receivers, mounted on the HMD and on a fixed point, can be used to allow detection of the position and orientation of the HMD by triangulation techniques. For example, the HMD could carry one or more directional transmitters, and an array of receivers associated with known or fixed points could detect the relative signals from the one or more transmitters. Or the transmitters could be fixed and the receivers could be on the HMD. Examples of transmitters and receivers include infra-red transducers, ultrasonic transducers and radio frequency transducers. The radio frequency transducers could have a dual purpose, in that they could also form part of a radio frequency data link to and/or from the HMD, such as a Bluetooth® link.

Figure 11:
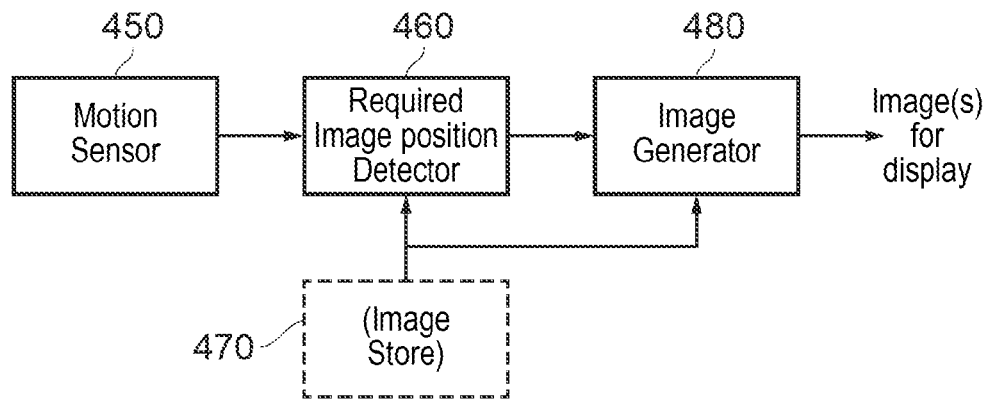
FIG. 11 schematically illustrates the generation of images in response to HMD position or motion detection.

FIG. 11 schematically illustrates image processing carried out in response to a detected position or change in position of the HMD.

As mentioned above in connection with FIG. 10, in some applications such as virtual reality and augmented reality arrangements, the apparent viewpoint of the video being displayed to the user of the HMD is changed in response to a change in actual position or orientation of the user's head.

With reference to FIG. 11, this is achieved by a motion sensor 450 (such as the arrangement of FIG. 10 and/or the motion detector 332 of FIG. 9*b*) supplying data indicative of motion and/or current position to a required image position detector 460, which translates the actual position of the HMD into data defining the required image for display. An image generator 480 accesses image data stored in an image store 470 if required, and generates the required images from the appropriate viewpoint for display by the HMD. The external video signal source can provide the functionality of the image generator 480 and act as a controller to compensate for the lower frequency component of motion of the observer's head by changing the viewpoint of the displayed image so as to move the displayed image in the opposite direction to that of the detected motion so as to change the apparent viewpoint of the observer in the direction of the detected motion.

Figure 12:
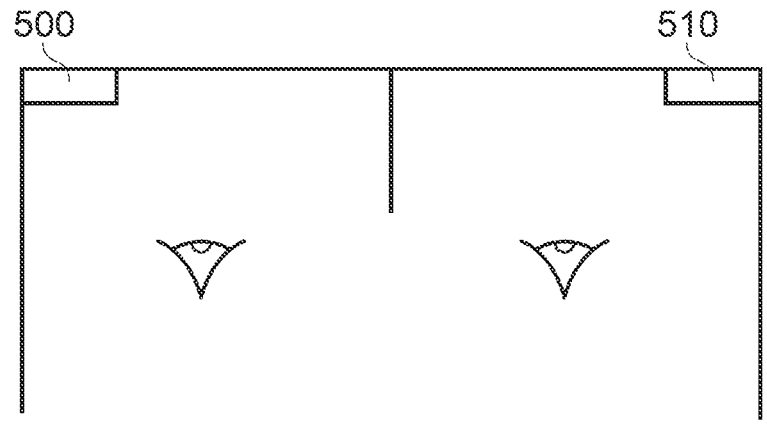
FIG. 12 is a further schematic plan view of an HMD.

FIG. 12 is a further schematic plan view of an HMD similar to the plan view of FIG. 2 described above. Features already described in connection with that Figure will not be described again. A pair of eye-tracking cameras 500, 510 are provided within the compartments corresponding to each eye tries to generate images of the wearer's eyes in use. Accordingly, the eye-tracking cameras 500, 510 are directed in a backwards direction relative to the orientation of the user's head, so that they look back at the user's eyes. Note that the cameras 500, 510 in FIG. 12 can be disposed anywhere with respect to the compartments corresponding to each eye, as long as they do not obscure the user's view of the displayed images; they are just shown in the outer corners by way of one schematic example.

To illuminate the user's eye, the cameras 500, 510 can rely on illumination provided by the displayed images within the HMD or, if that is insufficient, on infrared or other illumination directed towards the user's eyes.

Figure 13:
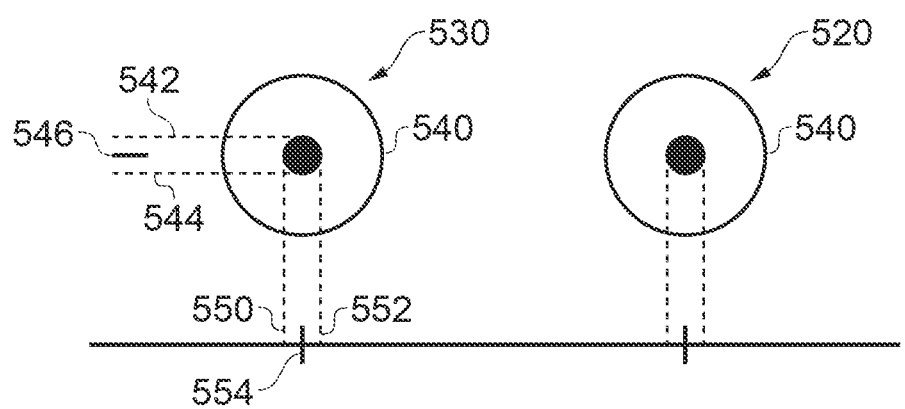
FIG. 13 schematically illustrates a pair of eye tracking images.

FIG. 13 schematically illustrates a pair of eye tracking images as captured by the cameras 500, 510. In particular, FIG. 13 shows an image 520 of the user's left eye and an image 530 of the user's right eye. In general, these will be captured as separate images but are shown alongside one another in FIG. 13 for the purposes of this explanation.

A significant feature to be derived from the captured images 520, 530 is the location of the pupils of the wearer's eyes. Note that the cameras 500, 510 are mounted in a fixed relationship relative to the frame of the HMD, and that, in use, the HMD adopts a fixed or at least a repeatable relationship to the user's head. Accordingly, from the image position of the pupils within the captured images 520, 530, the position of each pupil relative to the HMD, and therefore relative to the display elements of the HMD, can be directly established.

A first stage in detecting the pupil position is to detect the extent of the iris or coloured portion 540. Then, using known image processing techniques, a central region of the iris is scanned to establish the upper 542 and lower 544 bounds of the pupil (a dark area within the iris) to allow the vertical centre 546 of the pupil to be detected. As a crosscheck, the system establishes whether the vertical centre 546 is also the approximate vertical centre of the iris 540 (for example, the two vertical centres being laterally aligned to within, say, 10% of the iris diameter).

To establish the horizontal centre of the pupil, a horizontal scan of the captured image 520, 530 is carried out at the vertical position indicated by the vertical centre 546. This gives left 550 and right 552 boundaries of the pupil, from which a horizontal centre 554 of the pupil can be established.

The horizontal and vertical centres of each pupil, as established by the techniques discussed above, provide a set of coordinates of the pupil position. This detection can be carried out frequently. In embodiments of the invention, the detection is carried out at least as frequently as the image display rate of the display elements of the HMD, so that a next image to be displayed by the HMD can be corrected or at least altered using techniques to be described below according to the detected pupil positions found by a detection process carried out immediately before the display of that image. In other arrangements, the eye position may be detected less frequently than the image display frequency, but a most-recently detected eye position is used in the correction of each image for display.

In the arrangement of FIG. 12, there was some flexibility in the positioning of the cameras 500, 510 except that they should not obscure the user's view of the display elements of the HMD. A different arrangement is illustrated schematically in FIG. 14. A user's eye 560 views a display element 570 through an optical system shown schematically by a lens 580 but which (as discussed above) may include other optical elements. An eye tracking camera 590 is disposed so as to capture images of the user's eye 560 via at least a part of the optical system 580. So, where the optical system 580 comprises one or more lenses, the camera 590 is disposed so as to capture images of the user's eye through one or more of those lenses Similarly, if the optical system 580 comprises one or more reflectors, the camera 590 may be disposed so as to capture images of the user's eye via one or more of the reflectors. In the example shown in FIG. 14, the camera 590 is disposed alongside the display element 570, but in other embodiments the camera 590 could be positioned within a compound optical system 580.

In some embodiments, the position of only one eye and its associated pupil is tracked, so that only one of the eye tracking cameras is required. This is on the basis that, for most people, movements of one eye mapped directly to corresponding movements of the other eye. However, a feature of using two cameras is that the results for the pair of eyes can be checked against one another, and that individual detections can be obtained for each of the user's eyes.

Accordingly, these arrangements provide examples of an HMD system in which the eye position detector is configured to detect the pupil position of the HMD user's eyes.

Figure 14:
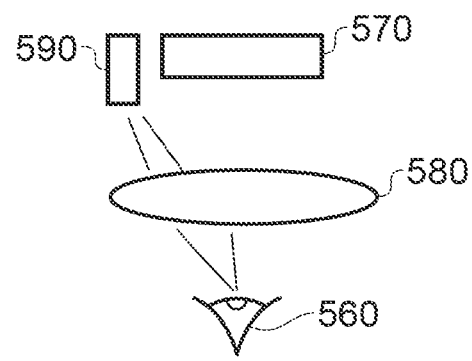
FIG. 14 schematically illustrates another technique for capturing eye tracking images.

Techniques for using the eye tracking information derived by the arrangements of FIGS. 12-14 will now be described.

Figure 15:
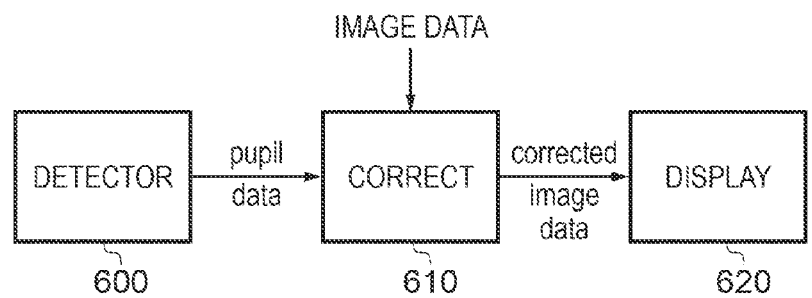
FIG. 15 schematically illustrates an image aberration corrector.

FIG. 15 schematically illustrates an image aberration corrector. This arrangement is based on a recognition that optical systems such as lenses used in HMDs can suffer from optical errors such as chromatic aberrations which depend upon the position of the viewer's pupils relative to the optical centres of the optical systems. Accordingly, the arrangement of FIG. 15 aims to provide a correction based upon the detected pupil position.

Referring to FIG. 15, a detector 600 comprises one or two eye tracking cameras of the type described above, along with processing to carry out the steps described with reference to FIG. 13. The output of the detector 600 comprises a set of data defining either or both of: (a) the absolute coordinates or position of one or each pupil (relative to a frame of reference defined relative to the HMD), and (b) deviations of the pupil position(s) from a nominal or expected pupil position.

A corrector 610 receives image data for display by the HMD (from an external or internal video source, for example) and applies a correction to that image data according to the pupil data received from the detector 600. An example of a corrector 610 of this type will be discussed below with reference to FIG. 16.

The corrector 610 passes corrected image data to a display arrangement 620, for example an arrangement including the display elements as discussed earlier.

The corrector 610 and the display arrangement 620 can be considered as examples of an image generator.

Figure 16:
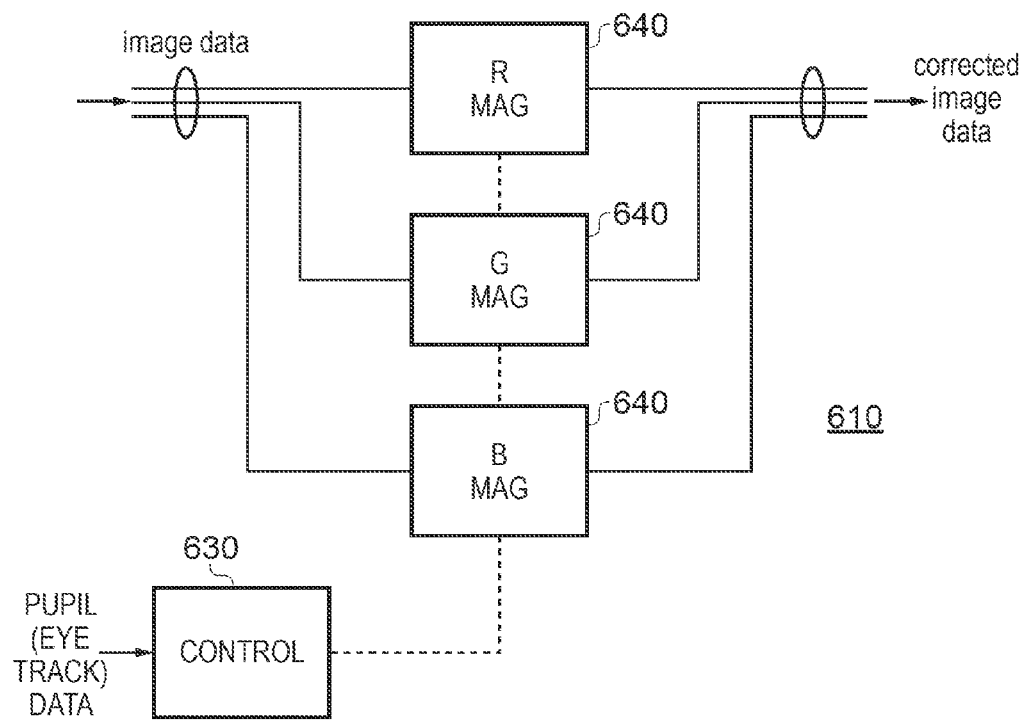
FIG. 16 schematically illustrates the corrector of FIG. 15 in more detail.

FIG. 16 schematically illustrates one example of the corrector 610 of FIG. 15 in more detail.

There are various ways of electronically correcting for optical aberrations. An example considered here is to vary the rectification or scaling applied to each of the various colour components of the image for display, so as to correct for the corresponding inverse variations caused by the chromatic aberrations.

In FIG. 16, a controller 630 receives the pupil data from the detector 600 and generates magnification coefficients according to (for example) a look-up table linking pupil positions to magnification coefficients. The controller 630 passes the magnification coefficients to respective processors 640R, 640G and 640B, which apply image magnification to the red, green and blue colour components respectively, according to the magnification coefficients provided by the controller 630. In this way, colour components of the input image data are processed so as to generate corresponding colour components of the corrected image data.

Note that the use of red, green and blue components is just one example, and other aspects or components of the images for display can be corrected in this way.

In other embodiments, it is noted that some examples of the optical systems of an HMD can be consistent in their chromatic and other aberration performance over a relatively wide range of inter-pupillary distances, but that other items can be corrected for. The other items include, for example, corrections for squint or pupil position asymmetry, which (if uncorrected) can lead to incorrect perception of 3D material. (Note however that such corrections can also be made in addition to the matters discussed above). Here, the detector 600 is operable to detect the position of both pupils and from this, and possibly data defining the left-right centre point of the HMD, derive a measurement of the user's squint or asymmetry. The corrector 610 corrects the disparity and/or focus of 3D objects as displayed, particularly those in the foreground.

Figure 17:
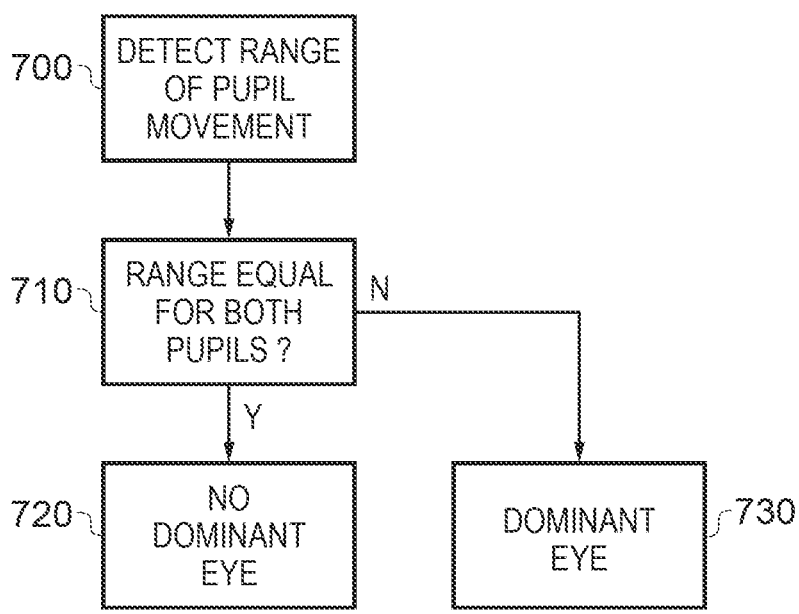
FIG. 17 is a schematic flowchart illustrating a dominant eye detection process.

FIG. 17 is a schematic flowchart illustrating a dominant eye detection process. So-called ocular dominance relates to a preference by an individual for visual input form one eye, over that from the other. It has been observed that most people exhibit this phenomenon to an extent. In some cases it leads to no externally distinguishable feature of the person's eye movements. But in some individuals ocular dominance can lead to the externally observable phenomenon that one eye (the non-dominant eye) exhibits a lower range of movement than the other, or lags the other, or stays still, or looks in a different apparent direction to the direction of actual gaze of the user. With regard to this last point, the term "apparent" is used because in some individuals, a third person looking at the individual would consider that the individual's eyes are pointing in different directions, but to the person concerned, the psychovisual system may have learned to compensate so that the person concerned sees a normal, rather than a double, image.

Detecting a dominant eye can provide various useful features in a pupil tracking HMD arrangement. Examples will be discussed below.

Referring to FIG. 17, at a step 700, the range of pupil movement is detected (for example by the detector 600) in respect of each eye. Here, the "range" can indicate for example (a) the amplitude of total movement, and/or (b) the movement in response to a particular stimulus (such as displaying a test or training image having an attention-attracting feature at a peripheral image position), and/or (c) the time-dependency of movement in response to such a stimulus.

At a step 710, if the range of movement is substantially equal for each eye (for example, the angular range and/or the time taken to reach a new gaze position are within, say, 15% for the two eyes) then control passes to a step 720 at which a detection is made that there is no dominant eye.

However, if there is a disparity (such as a disparity above the example extent mentioned above) then control passes to a step 720 at which a dominant eye is detected.

At the step 720, the dominant eye can be detected, for example, by one or more of the following:

(i) the eye with the wider range of movement;
  (ii) the eye which reaches a gaze direction appropriate to a displayed stimulus the closest and/or the most quickly;
  (iii) the eye which holds a position relating to a displayed stimulus.

Figure 18:
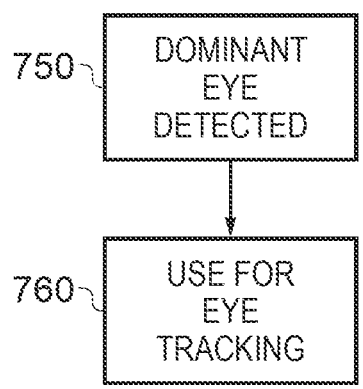
FIG. 18 is a schematic flowchart illustrating aspects of the operation of an HMD and associated processing.

FIG. 18 is a schematic flowchart illustrating aspects of the operation of an HMD and associated processing.

At a step 750, if a dominant eye has indeed been detected by the technique of FIG. 17, then at a step 760 the pupil position of that eye is used for eye tracking purposes which would otherwise have been carried out using detections relating to both eyes.

The operation of the step 760 can be absolute, for example to ignore eye tracking information obtained from the non-dominant eye, or can provide a weighted combination of eye tracking data from the two eyes such that a greater emphasis is given to eye tracking data from the dominant eye. The weighting could be arranged to vary according to the degree of disparity detected at the step 710, so that if one eye is slightly dominant, having a disparity of (say) 20% in the detected criterion or criteria, then the weighting is used so that the eye tracking information (direction) from the dominant eye is preferred (say) 65-35 relative to the corresponding information from the non-dominant eye. As the detected disparity increases, the relative weighting applied to dominant eye increases, towards a weighting of 100-0 relative to the non-dominant eye in (for example) a case where the non-dominant eye is detected to be fixed in position.

Accordingly, this arrangement can provide an example of an HMD system in which the dominant eye detector is configured to detect a degree of disparity of movement of the HMD user's eyes; and the image generator is configured to vary the weighting applied to the detected positions of the HMD user's eyes in dependence upon the detected disparity.

FIGS. 19 and 20 are schematic flowcharts illustrating aspects of operation of a games machine. Note that FIGS. 19 and 20 describe related aspects of operations, and while they are described separately for clarity of the description, in some example embodiments both sets of operations could be used in the same game.

Referring first to FIG. 19, at a step 800 a dominant eye is detected. At a step 810, the game enters a weapon aim mode, for example one in which the game user is aiming (using gaze tracking in respect of an HMD) a virtual weapon such as a virtual rifle or a virtual laser cannon. In such a mode, at a step 820, only eye tracking from the dominant eye is used in respect of the aiming process.

FIG. 20 provides similar steps 830 (corresponding to the step 800) and 840 (corresponding to the step 810). At a step 850, the display screen in respect of the non-dominant eye is blanked for the duration of the weapon aim mode so as to indicate to the user that the dominant eye is being used and to simulate the real-life feature of shutting one eye to assist with aiming a precision weapon. Indeed, the steps 800 and 830 encompass a detection that one eye is shut (in which case, for the purposes of these flow charts, the non-shut eye is at least temporarily treated as the dominant eye.

The display blanking at the step 850 can involve totally blanking the display, that is, displaying solid black rather than any image, or could involve reducing one or more of the average luminance, the contrast and the colour saturation of the "blanked" display, while leaving at least a vestigial displayed image.

Accordingly, this provides an example of the operation of an HMD system in which, in at least a subset of operational modes (such as a weapons aiming mode in execution of a computer game), the image generator is configured to change the image provided to the non-dominant eye so as to be less prominent than the image provided to the dominant eye.

In embodiments, the image generator is configured to reduce one or more of the average luminance, the contrast and the colour saturation of the image provided to the non-dominant eye.

In other embodiments the image generator is configured to replace the image provided to the non-dominant eye by a black image.

FIG. 21 schematically illustrates a games machine for implementing the operations discussed above. A games processor 860, operating under the control of appropriate software, receives data from eye cameras 870 such as those discussed above, and provides images for display to an the displays of an HMD 880. The games processor 880 can be considered as an example of an image generator. This arrangement, when operating as discussed above, provides an example of a head mountable display (HMD) system comprising: an eye position detector comprising one or more cameras configured to detect the position of each of the HMD user's eyes; a dominant eye detector configured to detect a dominant eye of the HMD user; and an image generator configured to generate images for display by the HMD in dependence upon the HMD user's eye positions, the image generator being configured to apply a greater weight to the detected position of the dominant eye than to the detected position of the non-dominant eye.

Accordingly, embodiments of the invention can provide a head mountable display (HMD) comprising a detection arrangement for detecting the position of one or both of the user's eyes (for example, the pupil position of one or both eyes) and an image correction arrangement for applying an image correction to images for display to the user according to the detected eye position.

In embodiments of the invention, the detection arrangement comprises one or more cameras. The one or more cameras may be positioned so is not obscure the display elements providing image display to the user. For example, the cameras may be positioned to the side of the display elements and their associated optical systems. In another example, the one or more cameras may be positioned so as to capture images of the user's eyes through at least a part of the optical systems associated with the display elements.

In embodiments of the invention, a correction is applied so as to change the respective scaling or magnification associated with colour components of the images for display.

In embodiments of the invention, the eye position is detected at least as frequently as the image display period, so that each image may be corrected by a newly detected eye position. In other embodiments, however, each image is corrected according to a most-recently detected eye position.

In embodiments of the invention, the detection arrangement is operable to detect asymmetric eye positions and the image correction arrangement is operable to alter the rendering of 3D images according to the detected asymmetry.

Embodiments of the invention also provide a system comprising an HMD and one or more of a base device such as a games console and an intermediate device such as a break-out box.

Embodiments of the invention can provide a method of operation of a head mountable display (HMD) comprising detecting the position of one or both of the user's eyes (for example, the pupil position of one or both eyes) and applying an image correction to images for display to the user according to the detected eye position.

It will be appreciated that the various techniques described above may be carried out using software, hardware, software programmable hardware or combinations of these. It will be appreciated that such software, and a providing medium by which such software is provided (such as a machine-readable non-transitory storage medium, for example a magnetic or optical disc or a non-volatile memory) are considered as embodiments of the present invention.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A head mountable display (HMD) comprising a detection arrangement configured to detect a position of one or both of a user's eyes and an image correction arrangement configured to apply an image correction to images for display to the user according to the detected eye position, in which the image correction arrangement is configured to change a respective scaling or magnification associated with color components of the images for display.

2. The HMD according to claim 1, in which:
the position comprises a pupil position of one or both eyes; and
the detection arrangement comprises one or more cameras.

3. The HMD according to claim 2, in which one or more cameras are:
positioned so as not obscure the display elements providing image display to the user or positioned to a side of the display elements and their associated optical systems; or
are positioned so as to capture images of the user's eyes through at least a part of the optical systems associated with the display elements.

4. The HMD according to claim 1, in which each image for display to the user is corrected according to a most-recently detected eye position.

5. The HMD according to claim 4, in which the detection arrangement is configured to detect the eye position at least as frequently as an image display period of images displayed to the user, so that each image may be corrected in accordance with a newly detected eye position.

6. A head mountable display (HMD) comprising a detection arrangement configured to detect a position of one or both of a user's eyes and an image correction arrangement configured to apply an image correction to images for display to the user according to the detected eye position, in which the detection arrangement is configured to detect asymmetric eye positions and the image correction arrangement is configured to alter a rendering of 3D images according to the detected asymmetry.

7. A system comprising:
a head mountable display (HMD) comprising a detection arrangement configured to detect a position of one or both of a user's eyes and an image correction arrangement configured to apply an image correction to images for display to the user according to the detected eye position, in which the image correction arrangement is configured to change a respective scaling or magnification associated with color components of the images for display; and
one or more of a base device and an intermediate device operatively coupled to the HMD.

8. A method of operation of a head mountable display (HMD), the method comprising:
detecting, by a detection arrangement, a position of one or both eyes of a user of the HMD; and
applying, by an image correction arrangement, an image correction to images for display to the user according to the detected eye position, wherein applying the image correction includes changing a respective scaling or magnification associated with color components of the images for display.

9. The method according to claim 8, in which each image for display to the user is corrected according to a most-recently detected eye position.

10. The method according to claim 9, in which the detecting includes detecting the eye position at least as frequently as an image display period of images displayed to the user, so that each image may be corrected in accordance with a newly detected eye position.

11. A method of operation of a head mountable display (HMD), the method comprising:
detecting, by a detection arrangement, a position of one or both eyes of a user of the HMD; and
applying, by an image correction arrangement, an image correction to images for display to the user according to the detected eye, wherein:
the detecting detects asymmetric eye positions; and
applying the image correction alters a rendering of 3D images according to the detected asymmetry.

* * * * *